United States Patent [19]
Trouchet

[11] Patent Number: 6,141,152
[45] Date of Patent: Oct. 31, 2000

[54] MULTIPLEXER/DEMUTIPLEXER WITH FLATTENED SPECTRAL RESPONSE

[75] Inventor: Denis M. Trouchet, Quincy Sous Senart, France

[73] Assignee: Corning Incorporated, Corning, N.Y.

[21] Appl. No.: 08/878,375

[22] Filed: Jun. 18, 1997

[30] Foreign Application Priority Data

Jul. 1, 1996 [EP] European Pat. Off. ............ 96401455

[51] Int. Cl.[7] .......................... G02B 27/14; G02B 27/10; G02B 6/34
[52] U.S. Cl. ............................ 359/634; 359/618; 385/37
[58] Field of Search .................................. 359/634, 662; 5/124, 130, 131, 618, 631, 636, 722, 724, 796; 385/37

[56] References Cited

U.S. PATENT DOCUMENTS

| | | | |
|---|---|---|---|
| 4,523,803 | 6/1985 | Arao et al. | 385/7 |
| 4,634,215 | 1/1987 | Reule | 385/43 |
| 4,739,501 | 4/1988 | Fussgänger | 359/130 |
| 4,846,540 | 7/1989 | Kapon | 385/45 |
| 4,852,079 | 7/1989 | Kinney et al. | 359/130 |
| 5,002,305 | 3/1991 | Raidel | 280/124.116 |
| 5,206,902 | 4/1993 | Bowker | 379/220 |
| 5,206,920 | 4/1993 | Cremer et al. | 985/37 |
| 5,325,221 | 6/1994 | Van der Tol | 359/116 |
| 5,412,744 | 5/1995 | Dragone . | |
| 5,444,805 | 8/1995 | Mayer | 385/49 |
| 5,546,483 | 8/1996 | Inoue et al. | 359/14 |
| 5,675,675 | 10/1997 | Trouchet . | |
| 5,748,811 | 5/1998 | Amersfoort et al. | 385/15 |
| 5,768,450 | 6/1998 | Bahagavatula | 285/24 |
| 5,966,483 | 10/1999 | Chowdhury | 385/37 |

FOREIGN PATENT DOCUMENTS

| | | |
|---|---|---|
| 0 188 764 | 12/1985 | European Pat. Off. . |
| 0 256 809 | 8/1987 | European Pat. Off. . |
| WO 91 15790 | 10/1999 | WIPO . |

OTHER PUBLICATIONS

Patent Abstracts of Japan, vol. 18 No. 126 (p–1702), & JP A 05 313029.

Patent Abstracts of Japan vol. 018, No. 241, (P–1733) May 9, 1994—JP 06 027338 A, Feb. 4, 1994.

M.R. Amersfoort et al., "Phased–array wavelength demultiplexer with flattened wavelength response", Electronic Letters, Feb. 17, 1994, vol. 30, No. 4, pp. 300–302.

K. Okamoto et al., "Arrayed–waveguide grating multiplexer with flat spectral response", Optics Letters, Jan. 1, 1995, vol. 20, No. 1, pp. 43–45.

*Primary Examiner*—Georgia Epps
*Assistant Examiner*—Saeed Seyrafi
*Attorney, Agent, or Firm*—William J. Chervenak

[57] ABSTRACT

A new multiplexer/demultiplexer includes a compound focusing mechanism having adjacent focal points. Multiple images of one or more input pathways for each different wavelength signal are projected onto one or more output pathways. The resulting spectral response is flattened in the vicinity of the center wavelength of each different wavelength signal. The number and spacing of the focal points, as well as the mode field radii of the input and output pathways, can be optimized for desired combinations of channel bandwidth, insertion loss, and crosstalk.

61 Claims, 13 Drawing Sheets

FIG. IA
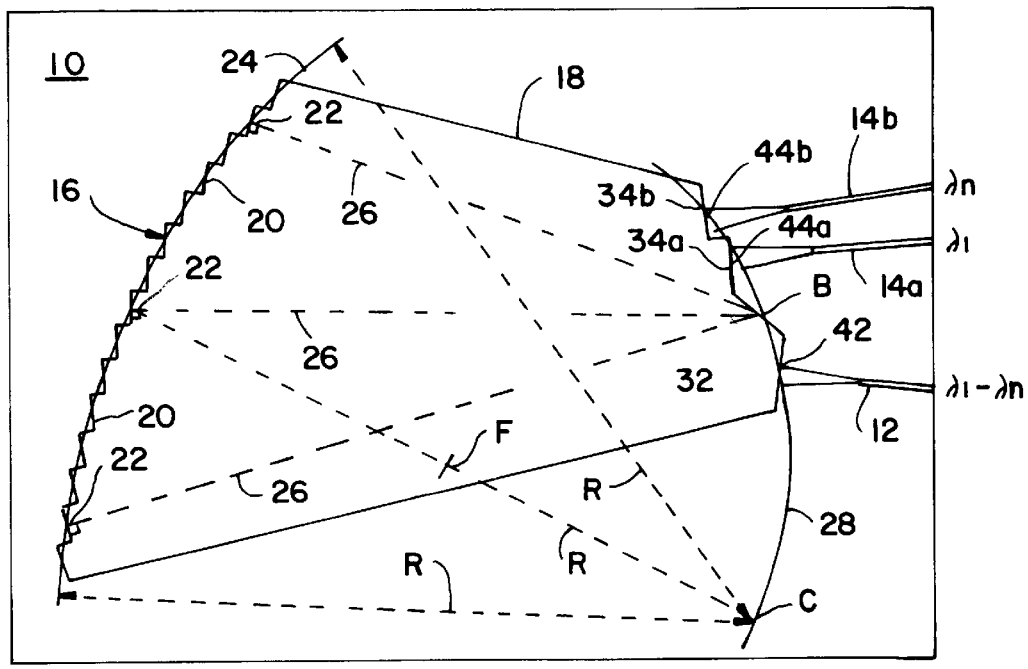
FIG. IB
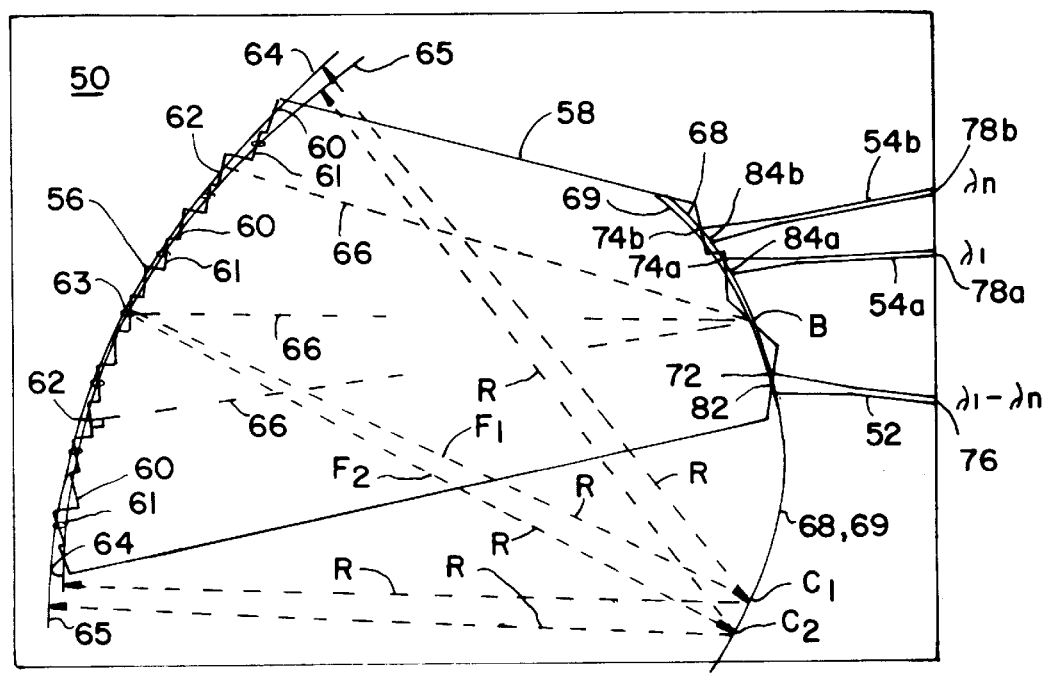

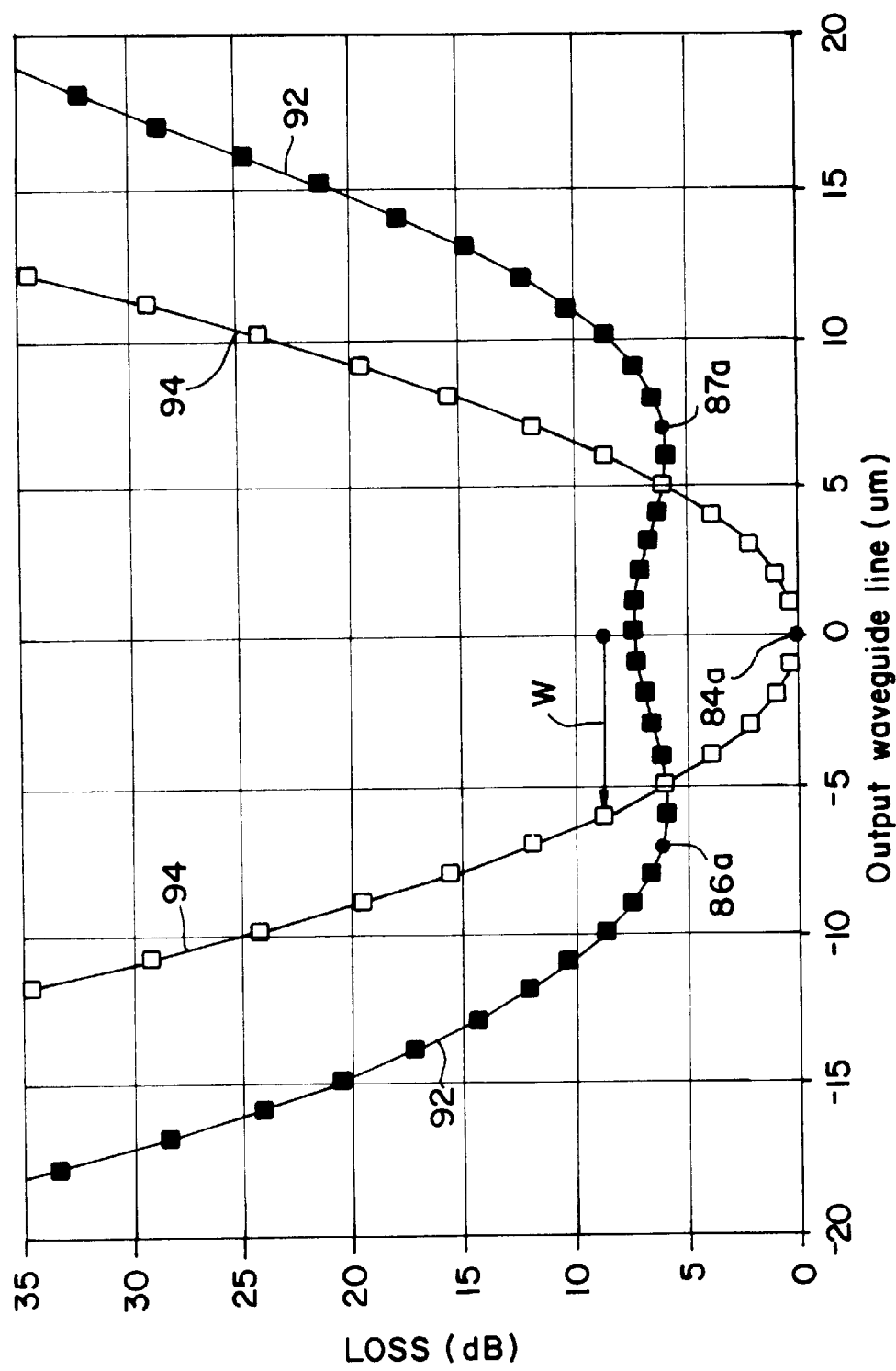

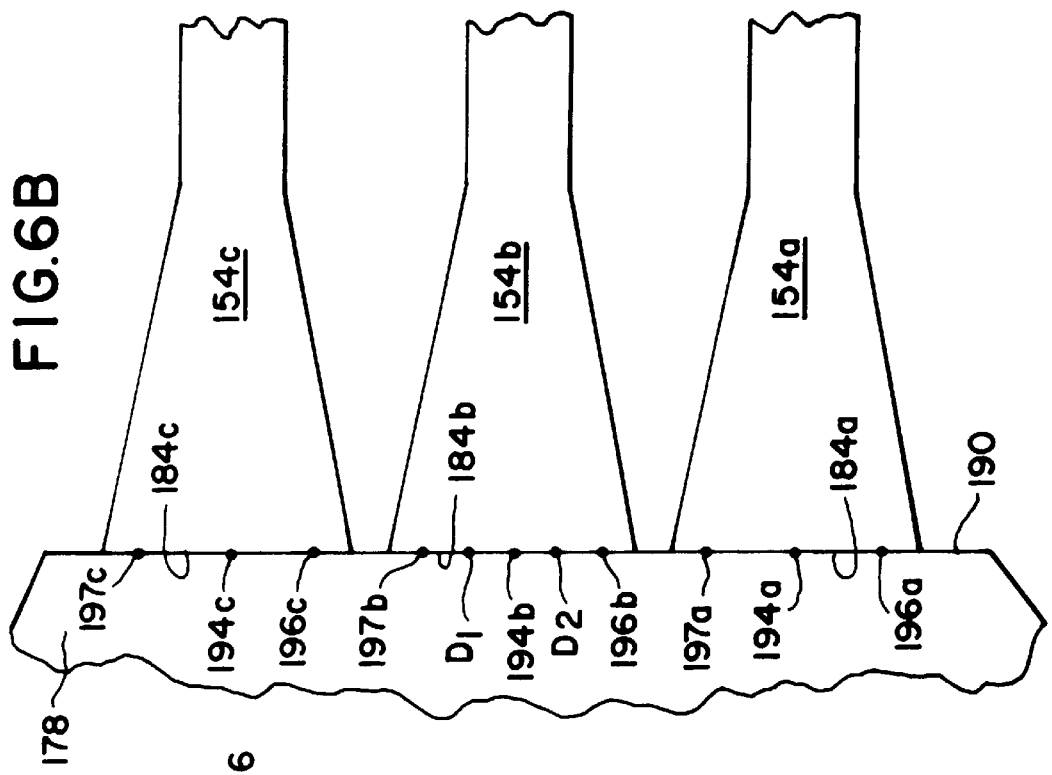
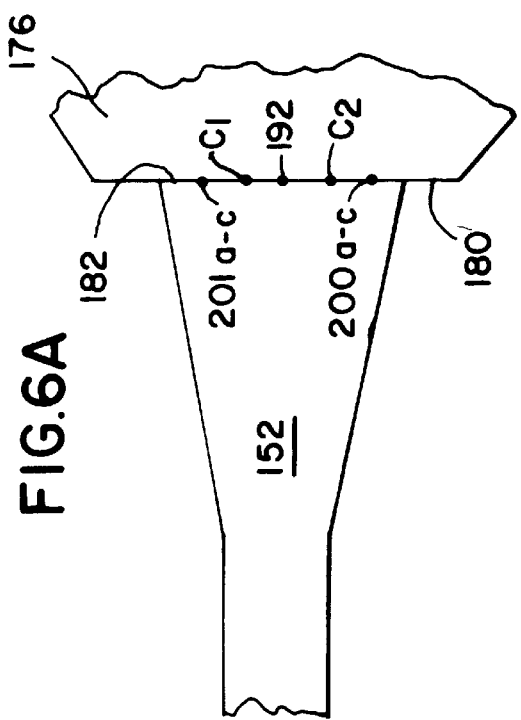

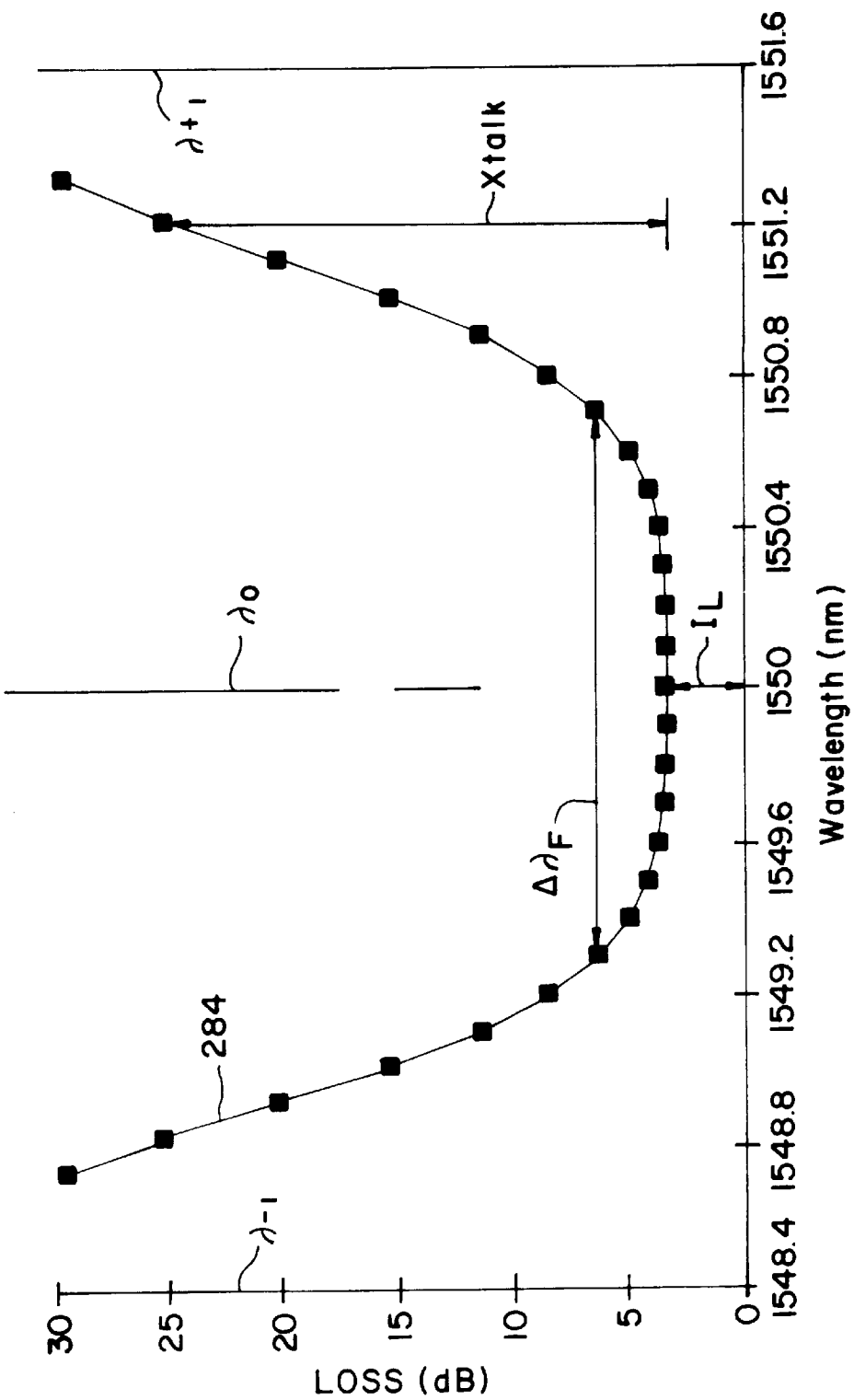

MULTIPLEXER/DEMUTIPLEXER WITH FLATTENED SPECTRAL RESPONSE

TECHNICAL FIELD

The invention relates to optical connectors including multiplexers and demultiplexers that route optical signals according to their wavelength.

BACKGROUND

Optical signals are transmitted at unique wavelengths referred to as channels. The spacing between channels is often as little as one nanometer in wavelength, so optical routing devices that combine or separate the different wavelength signals must be sensitive to such small differences in wavelength. Precisely designed devices are required to transmit the different wavelength signals with high efficiency and low crosstalk between adjacent channels.

However, it is common for the signals to drift slightly from their intended wavelength, particularly at their source. Unless more crosstalk can be tolerated, the transmission efficiency of the drifted signals is often significantly reduced. In addition, the transmission characteristics of routing devices themselves can vary during their manufacture or use.

Devices that combine or separate the different wavelength signals are referred to as multiplexers and demultiplexers, respectively. Often, the only difference between these devices is the direction of light travel through them. Multiplexers route different optical signals traveling separately in individual pathways into a common pathway. Demultiplexers route the optical signals traveling together in the common pathway back into the individual pathways.

Within multiplexers and demultiplexers, two optical mechanisms are used for routing the optical signals between the common and individual pathways—dispersion and focusing. Dispersion angularly distinguishes the different wavelength signals, and focusing converts the angularly distinguished signals into spatially distinguished signals.

For example, a focusing mechanism can be arranged to form discrete images of the common pathway in each wavelength of the different optical signals. The dispersing mechanism relatively displaces the images along a focal line by an amount that varies with the wavelength of the different signals. The individual pathways are arrayed along the focal line in positions corresponding to the displaced images of the different wavelength signals. Thus, each different wavelength signal forms a discrete image of the common pathway in a different position along the focal line, and the individual pathways are located along the focal line coincident with the image positions of the different wavelength signals.

The light energy within the common and individual pathways is distributed throughout a plane transverse to its direction of travel in a pattern defined by a mode field. Generally, the light amplitude distribution within each mode field is Gaussian. Maximum coupling efficiency occurs when the central amplitude of the imaged common pathway is exactly aligned with the central amplitudes of the respective individual pathways. Any drift in the wavelength of the different wavelength signals misaligns the central amplitudes of the paired mode fields and reduces coupling efficiency.

Spectral response curves measure coupling efficiency in units of decibel loss over a domain of wavelengths. Some small variation in decibels (e.g., one to three decibels) can generally be accommodated, and the corresponding range of wavelengths defines channel bandwidth. My copending U.S. patent application Ser. No. 08/581,186, filed Dec. 29, 1995, now U.S. Pat. No. 5,675,675, and entitled BANDWIDTH-ADJUSTED WAVELENGTH DEMULTIPLEXER, demonstrates possibilities for a tradeoff between channel bandwidth and crosstalk attenuation. A radius of the mode fields, defined at $1/e^2$ of the central light intensity, can be increased to enlarge the bandwidth at a cost of less crosstalk attenuation. Thus, any excess crosstalk attenuation in a design can be converted into larger bandwidths.

The ideal shape of the spectral response curve is a rectangular form resembling an inverted tophat. The bottom of the response curve is preferably as flat as possible to minimize decibel variations within the bandwidth, and the sides are as steep as possible to maximize the size of the bandwidth while maintaining the desired crosstalk attenuation in adjoining channels.

U.S. Pat. No. 5,412,744 to Dragone discloses a wavelength routing device operable as a multiplexer or demultiplexer with flattened response curves. Confocal star couplers connect two groups of waveguides (pathways) to opposite ends of a phase array. The focusing function is performed by the star couplers, and the dispersing function is performed by the phase array. The flattened response is achieved by using Y-shaped connectors to join remote ends of adjacent waveguides. Light is collected from two adjacent mode fields, and their overlapping response curves are combined.

However, additional spacing is required between pairs of adjacent waveguides to maintain the desired level of crosstalk attenuation. In comparison to similar devices without Y-shaped couplers, only one of every three waveguides can be used to avoid excessive crosstalk. This greatly diminishes the number of different wavelength signals that can be routed through the device.

A paper entitled APhased-array wavelength demultiplexer with flattened wavelength response@ by M. R. Amersfoort et al., published in ELECTRONIC LETTERS, Vol. 30, No. 4, Feb. 17, 1994, substitutes multimode waveguides for single mode waveguides in an output array to flatten spectral response. While it is possible to connect detectors to the multimode output waveguides, the device cannot be used to route different wavelength signals within a single mode optical network.

Another paper entitled Mrrayed-waveguide grating multiplexer with flat spectral response@ by K. Okamoto and H. Yamada, published in OPTICS LETTERS, Vol. 20, No. 1, Jan. 1, 1995, discloses modifications to a phase array for producing a near flat spectral response in a multiplexer. However, the path length variations required to accomplish the improved response are difficult to implement.

SUMMARY OF INVENTION

My invention in one or more of its various embodiments flattens the spectral response of multiplexers and demultiplexers in a manner that can be practically implemented in single mode optical networks. Compound focusing is used in combination with conventional wavelength dispersing to accommodate more wavelength variation of optical signals without excessive variation in transmission efficiency or reduction in crosstalk attenuation.

One expression of my invention as a wavelength multiplexer or demultiplexer includes conventional features of a common pathway that conveys a plurality of different wavelength signals, individual pathways that separately convey the different wavelength signals, and a central pathway that couples the different wavelength signals between the common and individual pathways. A dispersing mechanism within the central pathway angularly disperses the different wavelength signals, and a focusing mechanism within the central pathway converts the angular dispersion of the different wavelength signals into a spatial dispersion along a focal line.

However, in contrast to conventional multiplexers or demultiplexers, my focusing mechanism is a compound focusing mechanism having two or more adjacent focal points (i.e., adjacent principal points of focus) for producing multiple image points of each different wavelength signal in relatively displaced positions along the focal line. The individual pathways are located along the focal line so that each one coincides with the multiple image points of one of the different wavelength signals.

Both the dispersing mechanism and the focusing mechanism can take different forms. For example, in one embodiment of my invention, the dispersing mechanism is a diffraction grating and the focusing mechanism is a reflective surface of the diffraction grating. Alternate facets of the grating are aligned with different circles having displaced centers of curvature for producing the adjacent focal points. From a point of coincidence between the two circles, the adjacent focal points, which are conjugate to infinity, are located midway along respective radii to the displaced centers.

Another embodiment includes a phase array of waveguides for accomplishing dispersion and modifies one or both ends of the array within respective couplings to produce the adjacent focal points. Ordinarily, intermediate waveguides at opposite ends of a phase array converge toward single focal points in separate confocal relationships with the common and individual pathways. However, my invention provides for converging alternate intermediate waveguides toward more than one focal point in at least one of the couplers. Similar to the facets of the preceding embodiment, ends of the alternate waveguides can be aligned with different circles having displaced centers of curvature for producing the adjacent focal points. However, in contrast to the preceding embodiment, the centers of the different circles preferably coincide with the adjacent focal points.

My invention can be expressed in other terms as an optical connector for routing optical signals according to their wavelength. Again, a common pathway conveys a plurality of such optical signals within different bands of wavelengths, and individual pathways arranged in an array separately convey the optical signals within the different bands. A focuser separately images the common pathway in each wavelength of the optical signals. A wavelength disperser displaces the images of the common pathway along an inner end of the array according to their wavelength.

In addition, the focuser is modified to form at least two relatively displaced images for each wavelength along the end of the array. Accordingly, corresponding images in more than one wavelength can be formed at individual positions along the end of the array. The individual pathways of the array are respectively centered at the individual positions at which the corresponding images in different wavelengths are formed so that a wider range of wavelengths within each band can be coupled between the common and individual pathways with no additional variation in efficiency.

The focuser, together with the wavelength disperser, forms a plurality of optical couplings between the common and individual pathways, each exhibiting a spectral response curve defined by decibel loss over a domain of wavelengths.

The bands of wavelengths can be defined as contiguous groups of wavelengths within which decibel variation is less than a predetermined amount. Preferably, the multiple image points of each wavelength are offset by an amount that extends the range of wavelengths within each band beyond the range that would be possible with single image points. Further flattening of the spectral response curve is possible by using more than two adjacent focal points. For example, focusing mechanisms with three evenly spaced image points for each wavelength are preferred for this embodiment.

The formation of multiple adjacent focal points (i.e., multiple displaced image points for each wavelength) is a sound, simple, and straightforward manner of flattening the spectral response of wavelength routing devices. Accordingly, my invention can be practically implemented with a minimum of additional trouble or cost, using the same fabrication techniques as used for making similar devices with conventional focusing mechanisms.

In addition to the various expressions of my invention as apparatus, my invention can also be independently expressed as a method involving the routing of different wavelength signals between a common pathway and a plurality of individual pathways. The key steps include: (a) forming first and second sets of images of each of the different wavelength signals conveyed by the common pathway at inner ends of the individual pathways, and (b) relatively displacing the first and second sets of images so that the two images of each of the different wavelength signals are displaced at the inner ends of the individual pathways. The two images of each different wavelength signal are preferably displaced through a distance that is less than a distance separating centers of the inner ends of the individual pathways.

Although the step of displacing the images can result in some increase in crosstalk between adjacent individual pathways, my invention also provides for adjusting the size of the inner ends of the pathways (i.e., mode field radii) to maintain crosstalk attenuation at a minimum acceptable level. The number of adjacent focal points, the spacing between the focal points, and the size of the inner ends of the pathways can be optimized to provide a desired combination of channel bandwidth, crosstalk attenuation, and transmission efficiency (e.g., insertion loss).

DRAWINGS

FIG. 1A is a diagram schematically depicting a wavelength multiplexer/demultiplexer having a reflective-diffractive optic for focusing and dispersing different wavelength signals.

FIG. 1B is a similar diagram showing modifications to the reflective-diffractive optic for defining two adjacent focal points.

FIG. 3A is a graph of a diffracted field produced by multiple images of a common pathway overlaid on a mode field of an individual pathway.

FIG. 6A is an enlarged cut-away view along a focal line of one of the couplers.

FIG. 6B is an enlarged cut-away view along a focal line of the other coupler.

FIG. 9B is a graph showing a spectral response curve of an optical coupling between the same input and output pathways of the multiplexer/demultiplexer of FIG. 8.

DETAILED DESCRIPTION

Figure 2:
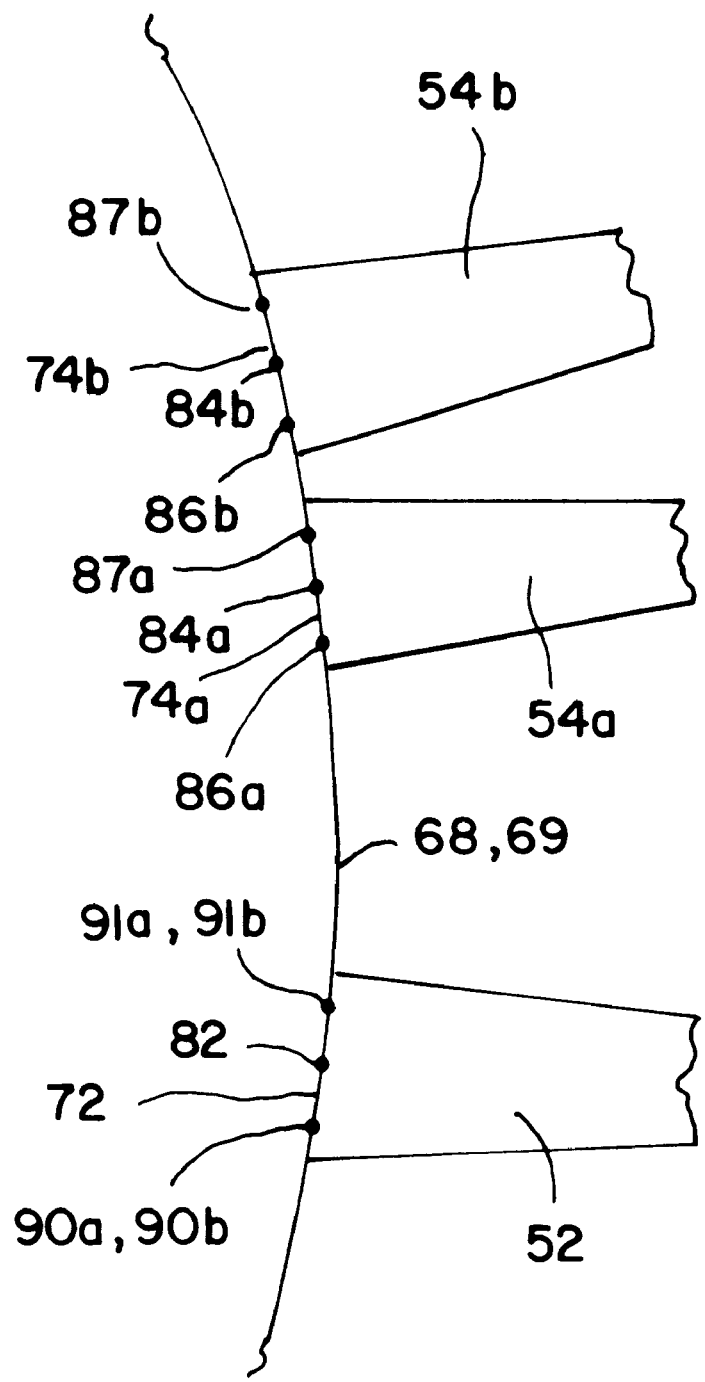
FIG. 2 is an enlarged cut-away view along a focal line of the multiplexer/demultiplexer of FIG. 1B.

Wavelength multiplexers and demultiplexers can be constructed with a wide variety of focusing and dispersing mechanisms. The focusing and dispersing functions can be performed by the same optical element, or separate optical elements can be used to perform each function. For illustration of my invention, FIGS. 1A–4B are directed to embodiments in which the focusing and dispersing functions are performed by a reflective-diffractive optic, and the remaining FIGS. 5A–9B are directed to embodiments in which the dispersing function is performed by a phase array and the focusing function is performed by a pair of optical couplers.

FIGS. 1A and 1B contrast a conventional multiplexer/demultiplexer 10 with an improved multiplexer/demultiplexer 50 according to my invention. Both can be understood to be implemented as integrated planar optics, which is the preferred form for my invention. The multiplexer/demultiplexer 10 includes a common waveguide (pathway) 12 for conveying a plurality of different wavelength signals "$\lambda_1$–$\lambda_n$" and a plurality of individual waveguides (pathways) 14a and 14b for separately conveying the different wavelength signals "$\lambda_1$" and "$\lambda_n$". For simplicity of illustration, only the two individual waveguides 14a and 14b are shown, but many more are ordinarily used. A reflective diffraction grating 16 couples the common and individual waveguides 12 and 14a–b through a central slab waveguide (central pathway) 18.

While it is possible to use other focusing schemes with reflective-diffractive optics, the reflective diffraction grating 16 contains a stepwise succession of facets 20 having centers 22 positioned along an arc 24 defined by a radius "R" and a center of curvature "C". The facets 20 are oriented at blaze angles so that lines 26 extending perpendicular to the facets 20 from their respective centers 22 converge toward a single blaze point "B". Both the blaze point "B" and the center of curvature "C" are located along a so-called Rowland circle 28 that is typically tangent to the reflective grating 16 with a diameter equal to the grating's radius of curvature "R". A focal point "F", which has infinity as its conjugate, coincides with the center of the Rowland circle 28.

Also located along the Rowland circle 28 are inner end 32 of the common waveguide 12 and inner ends 34a and 34b of the individual waveguides 14a and 14b. The Rowland circle 28 defines a focal line along which image and object conjugates of the inner ends 32, 34a, and 34b are located. In a demultiplexing mode, each of the different wavelength signals "$\lambda_1$–$\lambda_n$" launched by the common waveguide 12 is projected as an image of its inner end 32 onto a different one of the individual waveguide inner ends 34a and 34b. In a multiplexing mode, images of the inner ends 34a–b of the individual waveguides 14 are collectively projected onto the inner end 32 of the common waveguide 12.

Light energy conveyed through the inner ends 32 and 34a–b is distributed throughout mode fields extending perpendicular to the direction of propagation. Typically, the light intensity has a Gaussian distribution within the mode fields. The locations of peak intensities in the mode fields can be regarded as object points in their true locations on the Rowland circle 28 and as image points in their projected positions on the Rowland circle 28. For example, at particular wavelengths (i.e., $\lambda_1$ and $\lambda_n$), object point 42 at the inner end 32 of the common waveguide projects as two different image points coincident with object points 44a and 44b at the inner ends 34a and 34b of the individual waveguides; and at the same wavelengths, the object points 44a and 44b at the inner ends 34a and 34b project as a common image point coincident with the object point 42 at the inner end 32. Each different wavelength launched at the object points 42 and 44a–b of either the common waveguide 12 or the individual waveguides 14a–b is imaged to a particular position along the Rowland circle 28. However, the object points 42 and 44a–b only correspond to each other's image points at the wavelengths "$\lambda_1$" and "$\lambda_n$". At other wavelengths, the image points are offset from each other's object points 42 and 44a–b along the Rowland circle 28.

Coupling efficiency between the common and individual waveguides 12 and 14a–b is related to an overlap integral between the corresponding object and image mode fields. Since the light intensity distributions in both the object and image fields are somewhat akin to Gaussian, any departure from coincidence diminishes their coupling efficiency. Accordingly, any variation in the wavelengths of the different wavelength signals "$\lambda_1$–$\lambda_n$" can significantly vary the efficiency of their transmission through the multiplexer/demultiplexer device 10.

My new multiplexer/demultiplexer 50 accommodates more variation in the wavelengths of the different wavelength signals "$\lambda_1$–$\lambda_n$" with no additional variation in their transmission efficiency by adjusting both the size of the mode fields and the shape of the projected image fields, also referred to as diffracted fields. Similar to the multiplexer/demultiplexer 10, my new multiplexer/demultiplexer 50 includes a common waveguide 52 and a plurality of individual waveguides 54a and 54b coupled by a reflective diffraction grating 56 through a slab waveguide 58.

However, in contrast to the preceding embodiment, the reflective diffraction grating 56 includes two alternating sets of facets 60 and 61 having respective centers 62 and 63 located along two relatively inclined arcs 64 and 65. Although lines 66 extending perpendicular to the facets 60 and 61 from their respective centers 62 and 63 converge to a single blaze point "B", the arcs 64 and 65 have two different centers of curvature "$C_1$" and "$C_2$". Preferably, both arcs 64 and 65 have the same radius of curvature "R", but are tangent to two angularly displaced Rowland circles 68 and 69 defining adjacent focal points "$F_1$" and "$F_2$" at their respective centers of curvature.

Also in contrast to the preceding embodiment, the common and individual waveguides 52 and 54*a*–*b* taper in width to adjust respective mode field radii at their respective inner ends 72 and 74*a*–*b*. The mode field radii are defined at $1/e^2$ of the maximum intensity (i.e., the distance from the object point in the mode field at which the light intensity is $1/e^2$ of the light intensity at the object point). The waveguide taper provides a gradual adiabatic transition between the inner ends 72 and 74*a*–*b* and respective outer ends 76 and 78*a*–*b* that couple the multiplexer/demultiplexer 50 to an optical network (not shown).

Object point 82 at the inner end 72 of the common waveguide and object points 84*a*–*b* at the inner ends 74*a*–*b* of the individual waveguides are projected by the reflective diffraction grating 56 as pairs of adjacent image points, which can be seen in the enlarged cut-away view of FIG. 2. For sake of simplicity, the two Rowland circles 68 and 69, together with their corresponding focal lines, are drawn coincident. In the demultiplexing mode, the object point 82 is projected as pairs of image points 86*a*–87*a* and 86*b*–87*b*. The image points 86*a* and 87*a* straddle the object point 84*a* at the inner end 74*a* of the individual waveguide 54*a*, and the image points 86*b* and 87*b* straddle the object point 84*b* at the inner end 74*b* of the individual waveguide 54*b*. In the multiplexing mode, the object points 84*a* and 84*b* are projected as coincident pairs of image points 90*a*–91*a* and 90*b*–91*b* that straddle the object point 82.

The distance between the paired image points 86*a*–87*a*, 86*b*–87*b*, 90*a*–91*a*, and 90*b*–91*b* along the Rowland circle 68 corresponds to twice the distance between the centers of curvature $C_1$" and "$C_2$" but is less than the "wavelength dispersion along the Rowland circle between the different wavelength signals "$\lambda_1$–$\lambda_n$". Since the paired image points 86*a*–87*a*, 86*b*–87*b*, 90*a*–91*a*, and 90*b*–91*b* do not exactly coincide with their straddled object points 82, 84*a*, or 84*b*, some small reduction in coupling efficiency can be expected. However, any slight shift in the wavelengths of the different wavelength signals "$\lambda_1$–$\lambda_n$" moves one member (e.g., 86*a*) of the paired of image points (e.g., 86*a*, 87*a*) closer to the straddled object point (e.g., 84*a*) while moving the other member (e.g., 87*a*) the same distance farther away so that such slight shifts in wavelength can be expected to produce less variation in coupling efficiency.

The corresponding paired image fields, which form the diffracted field, are wider than a single projected image of one of the mode fields from the inner ends 72 or 74*a*–*b*. This tends to increase channel bandwidth as well as crosstalk. However, crosstalk attenuation can be restored to a desired minimum level by reducing the mode field radii at the inner ends 72 and 74*a*–*b*. The earlier-described taper between the inner ends 72 and 74*a*–*b* and the outer ends 76 and 78*a*–*b* of the common and individual waveguides 52 and 54*a*–*b* allows the mode field radii at the inner ends 72 and 74*a*–*b* to be sized independently of the waveguide width at their outer ends 76 and 78*a*–*b*, which are connected to the network.

More information concerning the adjustment of mode field radii to achieve a desired tradeoff between channel bandwidth and crosstalk attenuation is disclosed in my copending U.S. application Ser. No. 08/581,186, filed Dec. 29, 1995. This application is hereby incorporated by reference.

The alternating facets 60 and 61 also introduce a second periodicity that reduces the free spectral range of my diffraction grating 16 within which wavelengths are uniquely dispersed. Additional diffraction peaks at which evenly spaced wavelengths are diffracted in a common direction are superimposed midway of primary diffraction peaks that are approximately spaced by a quotient of a median wavelength and the diffraction order. The additional diffraction peaks reduce the free spectral range by a factor corresponding to the number of different focal points "$F_1$" and "$F_2$". For example, two focal points reduce the free spectral range by a factor of two, and three focal points reduce the free spectral range by a factor of three.

Despite this reduction, the range of channels transmitted by my new multiplexer/demultiplexer (i.e., the operating bandwidth) must remain within the free spectral range. Where necessary, the diffraction order can be reduced to restore the required free spectral range. However, reducing the diffraction order also reduces the required linear dispersion of wavelengths along the focal line. This latter problem can be resolved by increasing the grating radius of curvature "R" or by reducing the grating pitch.

Alternatively, the additional diffraction peaks can be suppressed by grouping the facets 60 and 61 having similar centers of curvature together. For example, one-half of the grating 16 can have contiguous facets 60 centered at "$C_1$", and the other half of the grating 16 can have contiguous facets 61 centered at "$C_2$". Although the additional diffraction peaks are suppressed, this solution can yield smaller channel bandwidths and lower cross-talk attenuation between adjacent channels.

Two numerical examples of my invention according to the present embodiment are provided below. The overall design parameters are as follows:

| | |
|---|---|
| Center channel wavelength | 1550 nm |
| Wavelength spacing between adjacent channels | 1.0 nm |
| Wavelength dispersion at focal line | 20.0 :μ/nm |

The variables to be optimized are as follows:

| | Example A | Example B |
|---|---|---|
| Spacing between centers ($C_1$, $C_2$) | 7.0 :m | 8.5 :μm |
| Mode field radius (w) | 6.0 :m | 5.1 :μm |

The resulting tradeoffs between insertion loss "$I_L$" (defined as the minimum loss of each band), loss ripple "$\Delta I_L$" (defined as the loss increase at the channel center with respect to the minimum loss of each band), channel bandwidth "$\Delta \lambda_F$" (defined as a range of wavelengths within 3 dB of the minimum loss of each band), and crosstalk attenuation "Xtalk" (defined as the attenuation of adjacent channel centers with respect to the minimum loss of each band) are as follows:

|  | Example A | Example B |
| --- | --- | --- |
| Insertion loss ($I_L$) | 1.9 dB | 3.0 dB |
| Loss ripple ($\Delta I_L$) | 0.0 dB | 2.0 dB |
| Channel bandwidth ($\Delta\lambda_F$) | 1.0 nm | 1.21 nm |
| Crosstalk attenuation (Xtalk) | 22.0 dB | 22.0 dB |

Given a 22.0 dB crosstalk attenuation "Xtalk" at adjacent channel centers, both examples A and B have wider channel bandwidths "$\Delta\lambda_F$" than a 0.75 nm bandwidth that is possible by optimizing the mode field radius "w" alone. However, increased spacing between the two grating centers "$C_1$" and "$C_2$" also results in a higher insertion loss "$I_L$" and loss ripple "$\Delta I_L$", which can be balanced against the need for a larger bandwidth "$\Delta\lambda_F$".

Figure 3B:
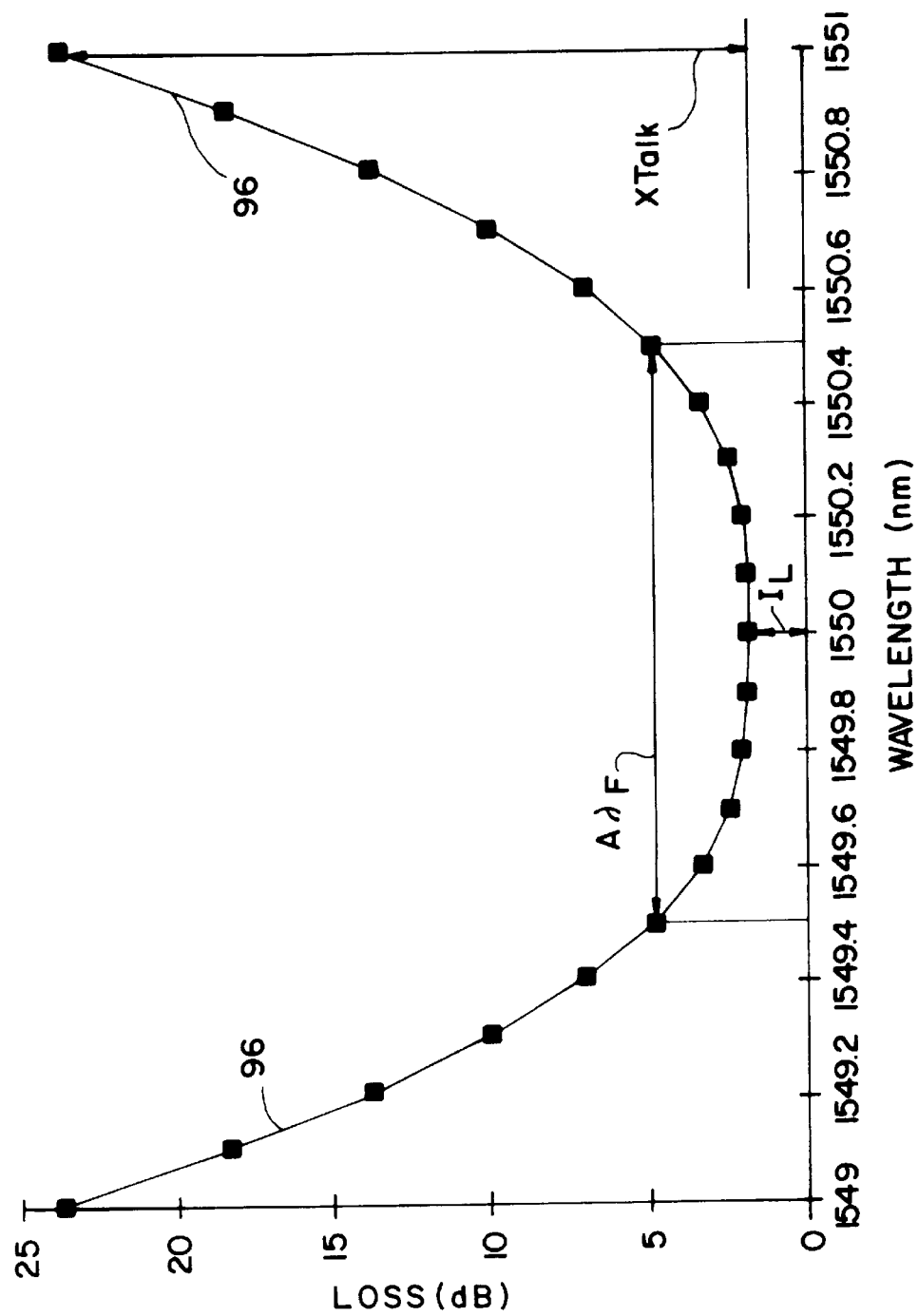
FIG. 3B is a graph showing a spectral response curve of an optical coupling between the common pathway and the one individual pathway.
Figure 4A:
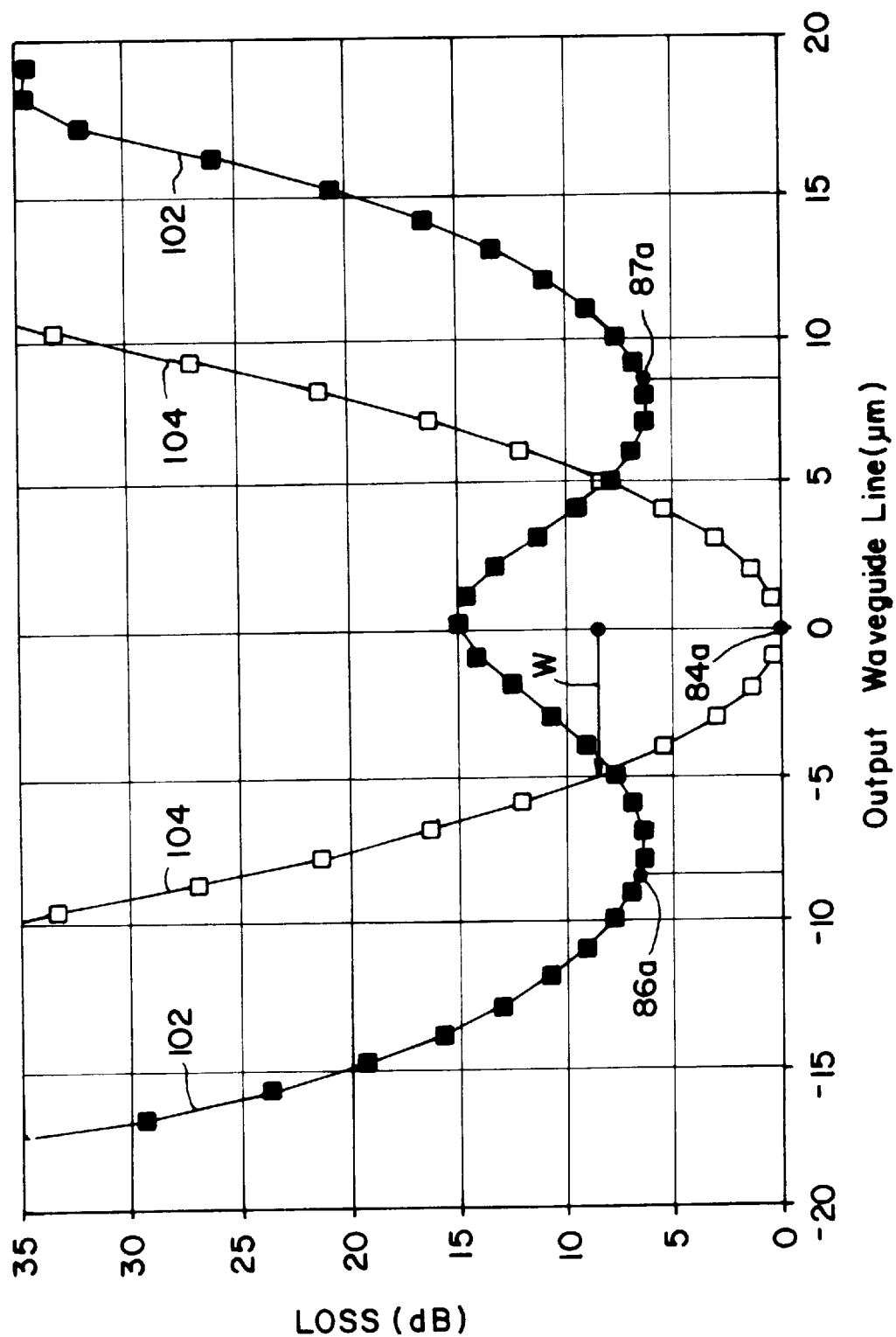
FIG. 4A is a graph similar to the graph of FIG. 3A but showing changes to the diffracted field accompanying an increase in spacing between the focal points.
Figure 4B:
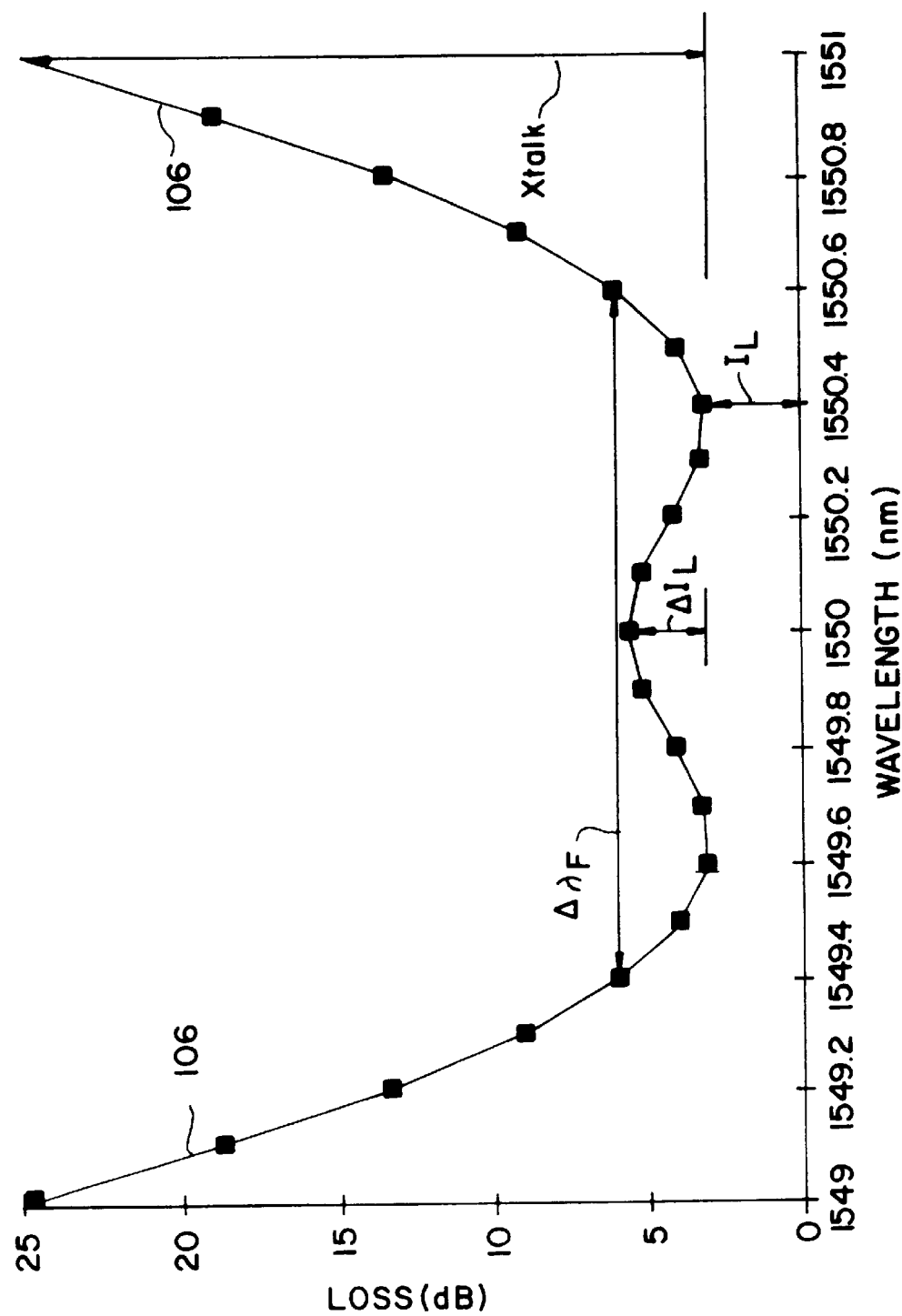
FIG. 4B is a graph similar to the graph of FIG. 3B showing the effects of the spacing changes on the spectral response curve.

Graphical representations of Example A are provided in FIGS. 3A and 3B, and similar representations of Example B are provided in FIGS. 4A and 4B. For example, FIG. 3A shows the intensity profile of a diffracted field 92 overlaid on a mode field 94 of the inner end 74a. The intensities of the two fields 92 and 94 are represented in terms of decibel loss over a range of distances measured from the object point 84a. In the past, the diffracted and object fields were made coincident. However, the two focal points "$F_1$" and "$F_2$" of my invention modify the diffracted field 92 to include two lobes straddling the object point 84a. The image points 86a and 87a of the diffracted field 92 are apparent near the peak intensities of the two lobes.

The position of the mode field 94 is fixed, but the diffracted field 92 shifts in position along the Rowland circles 68 and 69 as a function of wavelength. In comparison to diffracted fields that exactly match the shape of the fixed mode field 94 for maximum transmission efficiency of a given wavelength, small shifts of the flattened diffracted field 92 have less effect on the area of overlap between the two fields 92 and 94 and correspondingly less effect on the transmission efficiency of neighboring wavelengths.

FIG. 3B depicts a spectral response curve 96 of the coupling between the common waveguide 52 and the individual waveguide 54a. The spectral response curve 96 is calculated as a overlap integral between the diffracted field 92 and the mode field 94. Channel bandwidth "$\Delta\lambda_F$" extends between 1549.5 nm and 1550.5 nm, and crosstalk attenuation "Xtalk" at the adjacent channels (15449 nm and 1551 nm) is 22 dB. The insertion loss "$I_L$" is 1.9 dB with no loss ripple "$\Delta I_L$" at the center wavelength (1550 nm). Within the bandwidth "$\Delta\lambda_F$", it is apparent that less variation in coupling efficiency is associated with wavelengths near the center wavelength of 1550 nm.

Effects of further separating the centers of curvature "$C_1$" and "$C_2$" to 8.5 :m spacing are shown in FIGS. 4A and 4B. The image points 86a and 87a of a diffracted field 102 are further separated from the object point 84a of a narrower mode field 104. The corresponding spectral response curve 106 has a significantly enlarged channel bandwidth "$\Delta\lambda_F$" (1.21 nm) but maintains the same crosstalk attenuation "Xtalk" of 22 dB. However, insertion loss "$I_L$" and loss ripple "$\Delta I_L$" both increase.

The effects of the adjacent focal points "$F_1$" and "$F_2$" can also be considered individually with the same results. For example, the focal points "$F_1$" and "$F_2$" can be understood to produce two different sets of images of the common pathway 52 along the respective Rowland circles 68 and 69. Within each set, the images of the common pathway 52 are displaced as a function of wavelength. However, since the centers of curvature "$C_1$" and "$C_2$" are also spaced apart along the two Rowland circles 68 and 69, the two sets of images are also displaced with respect to each other. Accordingly, the images of two different wavelengths can be superimposed at each location at which the sets of images overlap. The individual pathways 54a–b are also present at these locations so that two different wavelengths can be conveyed by each of the individual pathways 54a–b with equal efficiency. As the centers of curvature "$C_1$" and "$C_2$", along with their corresponding focal points "$F_1$" and "$F_2$", are further separated, these wavelengths become apparent from the multiple peak intensities of the resulting spectral response curve (see FIG. 4B).

Figure 5A:
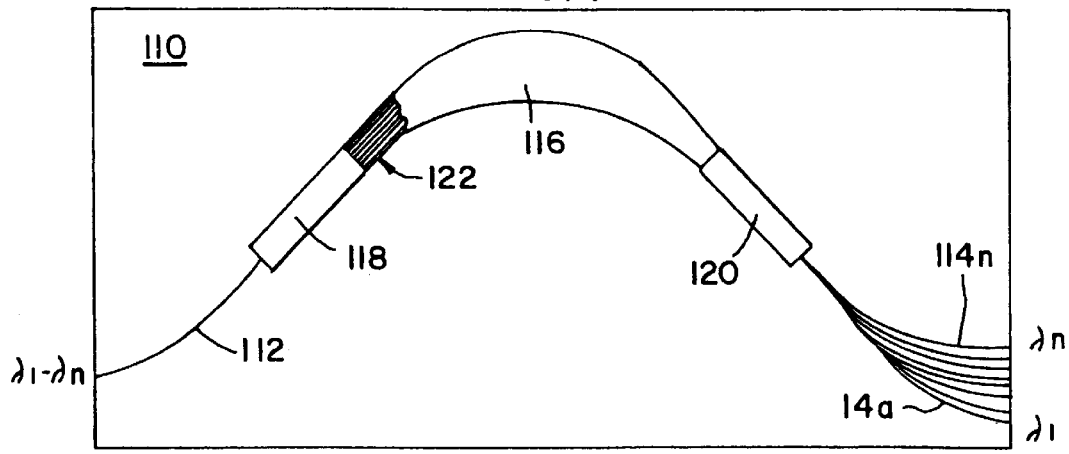
FIG. 5A is a diagram of a multiplexer/demultiplexer having a phase array and two optical couplers for focusing and dispersing different wavelength signals.

The remaining embodiments illustrated by FIGS. 5A–9B adapt different dispersing and focusing mechanisms for producing multiple focal points (i.e., multiple displaced image points for each wavelength). FIG. 5A shows the overall configuration of a conventional phase array multiplexer/demultiplexer 110. Implemented in planar form, the multiplexer 110 includes a common waveguide (pathway) 112 and an array of individual waveguides (pathways) 114a–114n interconnected by a phase array 116 and two optical couplers 118 and 120 (central pathway). The phase array 116 is an optical path length difference generator having a plurality of different length intermediate waveguides (pathways) 122 for angularly dispersing the different wavelength signals "$\lambda_1$–$\lambda_n$".

Figure 5B:
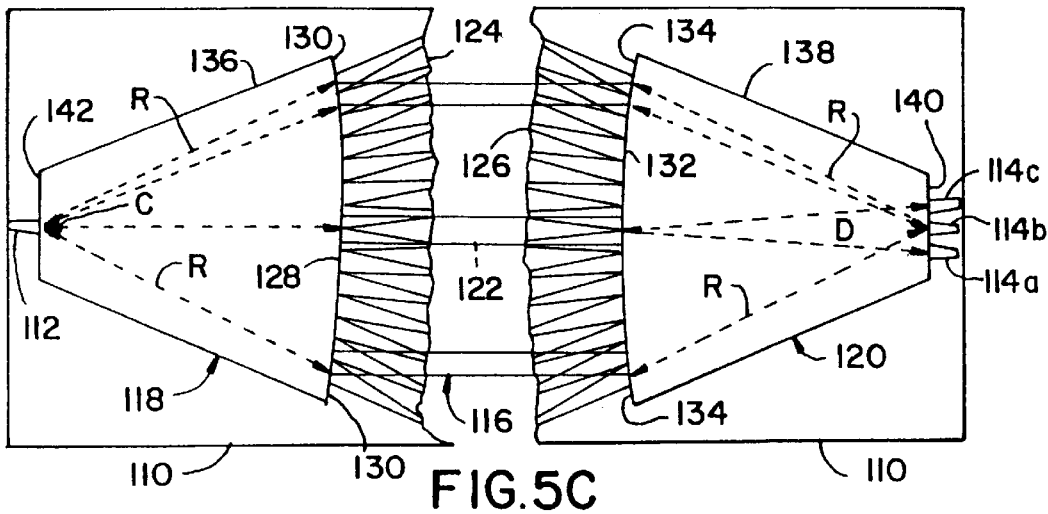
FIG. 5B is a diagram with broken-away views showing more details of conventional optical couplers.
Figure 5C:
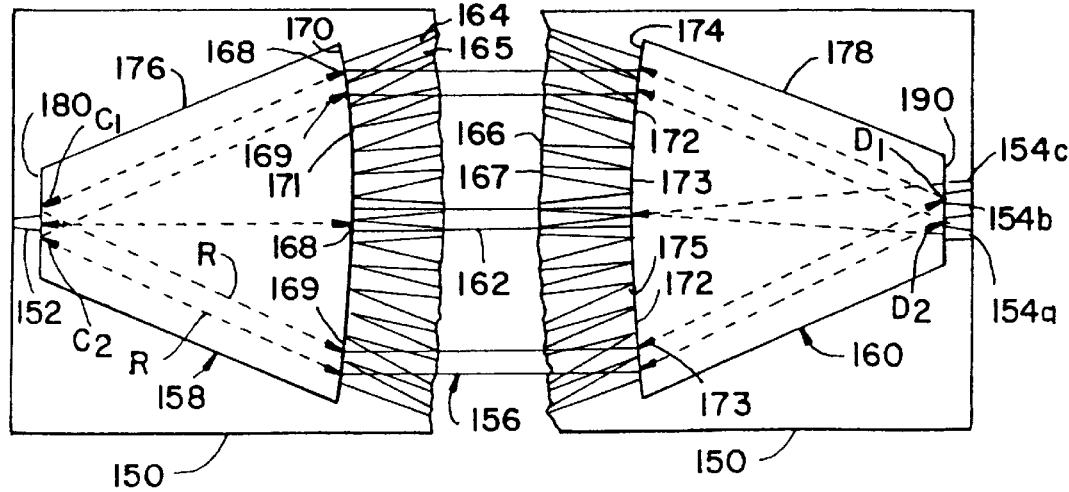
FIG. 5C is a diagram also with broken-away views showing modifications to the optical couplers for defining two adjacent focal points within each coupler.

The two optical couplers 118 and 120 are shown in more detail in FIG. 5B. Opposite end portions 124 and 126 of the intermediate waveguides 122 converge from ostensibly parallel paths toward separate focal points "C" and "D". End faces 128 of the end portions 124 are located along an arc 130 having a radius of curvature AR@ and a center of curvature at the focal point "C". Similar end faces 132 of the end portions 126 are located along an arc 134 also having a radius of curvature "R" but a center of curvature at the focal point "D".

In the demultiplexing mode, the plurality of different wavelength signals "$\lambda_1$–$\lambda_n$" launched by the common waveguide 112 diverge through the free space of a slab waveguide 136 and enter the intermediate waveguides 122 as parallel wavefronts. The intermediate waveguides 122 vary in optical path length, preferably by a constant path length difference between adjacent waveguides, for transforming the parallel wavefronts of the different wavelength signals "$\lambda_1$–$\lambda_n$" into relatively inclined wavefronts in accordance with their respective wavelengths. The relatively inclined wavefronts of the different wavelength signals "$\lambda_1$–$\lambda_n$" exit the intermediate waveguides 122 on respective converging paths through the free space of a slab waveguide 138 and come to focus at different points along a focal line 140 according to their wavelength. The individual waveguides 114a–c are located along the focal line 140 in positions corresponding to the expected focus positions of the different wavelength signals "$\lambda_1$–$\lambda_n$".

In the multiplexing mode, the individual waveguides 114a–c launch the different wavelength signals "$\lambda_1$–$\lambda_n$" on diverging paths through the slab waveguide 138 from different positions along the focal line 140. The different wavelength signals "$\lambda_1$–$\lambda_n$" enter the intermediate waveguides 122 as relatively inclined wavefronts but exit the intermediate waveguides as parallel wavefronts on a converging course through the slab waveguide 136 to the focal point "C". The common waveguide 112 is aligned with the focal point "C" for conveying the combined different wavelength signals "$\lambda_1$–$\lambda_n$".

My new phase-array multiplexer/demultiplexer 150, which is illustrated by FIGS. 5C–7B, is arranged similar to the multiplexer/demultiplexer 110 but includes pairs of focal points "$C_1$–$C_2$" and "$D_1$–$D_2$" for improving spectral response. The similar features include a common waveguide 152 and three of what is expected to be eight or more individual waveguides 154, 154b, and 154c interconnected by a phase array 156 and two optical couplers 158 and 160.

In contrast to the preceding embodiment, both of the opposite end portions of intermediate waveguides 162 of the phase array 156 are divided into alternating groups of end portions 164–165 and 166–167. Within the coupler 158, the end portions 164 converge through a slab waveguide 176 to the focal point "$C_1$," and the end portions 165 similarly converge to the focal point $C_2$. End faces 168 of the end portions 164 are located along an arc 170 centered at the focal point $C_1$, and end faces 169 of the end portions 165 are located along an arc 171 centered at the focal point $C_2$. Within the coupler 160, the end portions 166 converge through a slab waveguide 178 to the focal point "$D_1$", and the end portions 167 similarly converge to the focal point "$D_2$". End faces 172 of the end portions 166 are located along an arc 174 centered at the focal point "$D_1$", and end faces 173 of the end portions 167 are located along an arc 175 centered at the focal point "$D_2$". All of the arcs 170, 171, 174, and 175 can have the same radius of curvature "R".

Enlarged cut-away views of respective intersections between two slab waveguides 176 and 178 and the common and individual waveguides 152 and 154a–c are shown in FIGS. 6A and 6B. The slab waveguide 176 joins with an inner end face 182 of the common waveguide 152 along a focal line 180. The slab waveguide 178 joins with inner end faces 184a, 184b, and 184c of the respective individual waveguides along a focal line 190.

In the demultiplexing mode, an object point 192 of a mode field at the inner end 182 of the common waveguide 152 is projected as pairs of image points 196a–197a, 196b–197b, and 196c–197c. In the multiplexing mode, object points 194a, 194b, and 194c of the respective mode fields at the inner ends 184a–c of the individual waveguides are projected as coincident pairs of image points 200a–201a, 200b–201b, and 200c–201c. The spacing between all of the pairs of image points is equal to the sum of the spacing between the pairs of focal points "$C_1$ and $C_2$" and "$D_1$ and $D_2$".

Similar to the preceding embodiment, the alternating groups of end portions 164–165 and 166–167 introduce a second periodicity that reduces the free spectral range of the phase-array multiplexer/demultiplexer 150. The paired focal points "$C_1$", "$C_2$" and "$D_1$", "$D_2$" produce additional diffraction peaks midway of the primary diffraction peaks. Again, the free spectral range can be re-expanded to encompass the required operating bandwidth by reducing the diffraction order, which is accomplished by decreasing the optical path length differences between the intermediate waveguides 162. The required linear dispersions of the different wavelengths along the respective focal lines 180 and 190 are preferably achieved by corresponding increases in the radius of curvature "R". Similarly aligned end portions 164–165 and 166–167 could also be grouped together to suppress the additional diffraction peaks.

A numerical example of this embodiment has the following basic parameters:

| | |
|---|---|
| Center channel wavelength | 1550 nm |
| Wavelength spacing between adjacent channels | 1.6 nm |
| Wavelength dispersion at focal line | 11.25 :$\mu$/nm |

The optimized variables and the resulting tradeoff are as follows:

| | |
|---|---|
| Number of focal points per coupler | 2 |
| Spacing between adjacent focal points | 5.0 :$\mu$m |
| Mode field radius (w) | 3.7 :$\mu$m |
| Insertion loss ($I_L$) | 2.9 dB |
| Loss ripple at channel center ($\Delta I_L$) | 2.3 dB |
| Channel bandwidth within 3 dB loss ($\Delta 8_F$) | 1.4 nm |
| Crosstalk attenuation within 0.4 nm (Xtalk) | 22.0 dB |

Figure 7A:
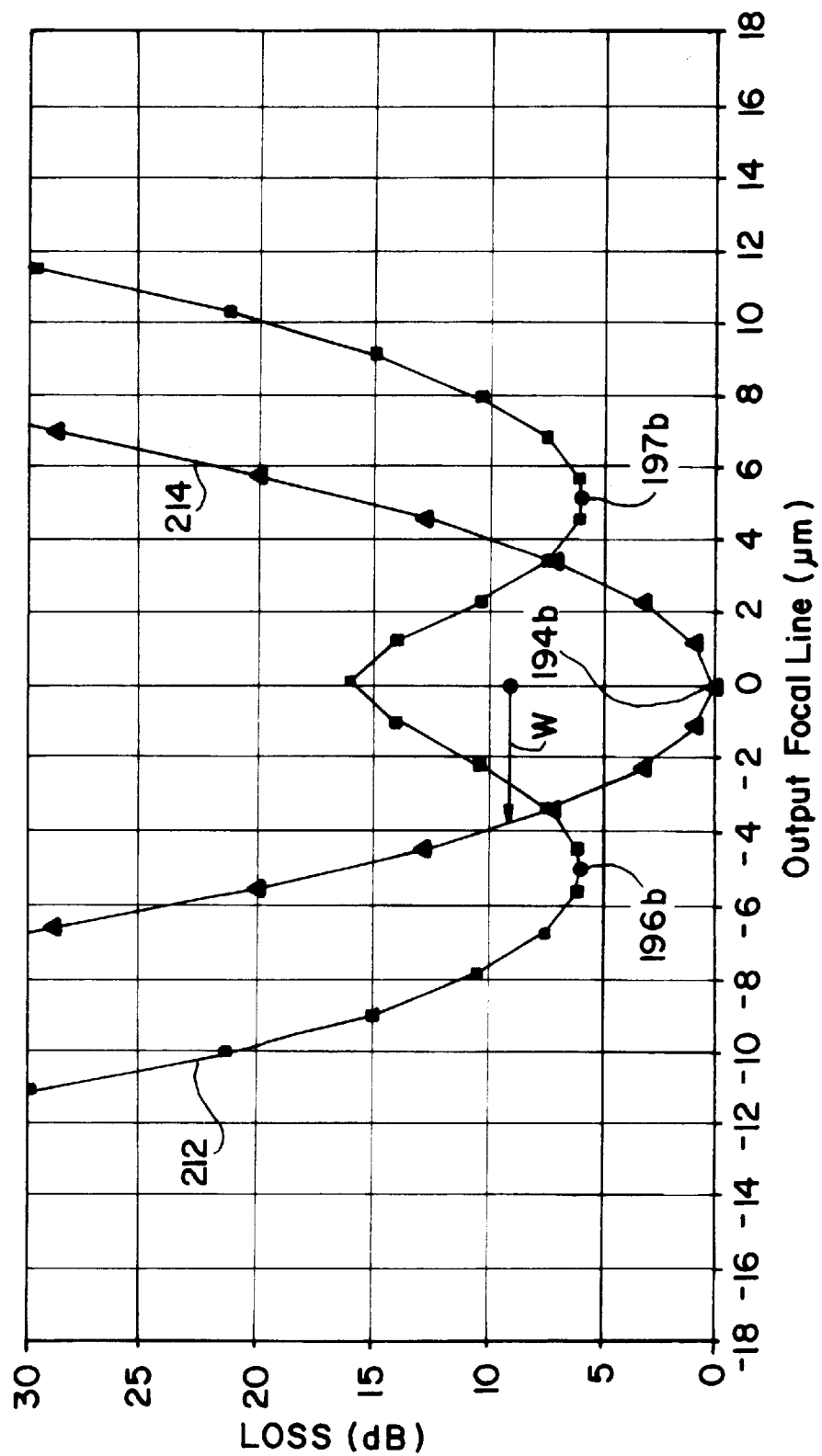
FIG. 7A is a graph of a diffracted field produced within the multiplexer/demultiplexer of FIG. 5C by paired images of a common pathway overlaid on a mode field of an individual pathway.
Figure 7B:
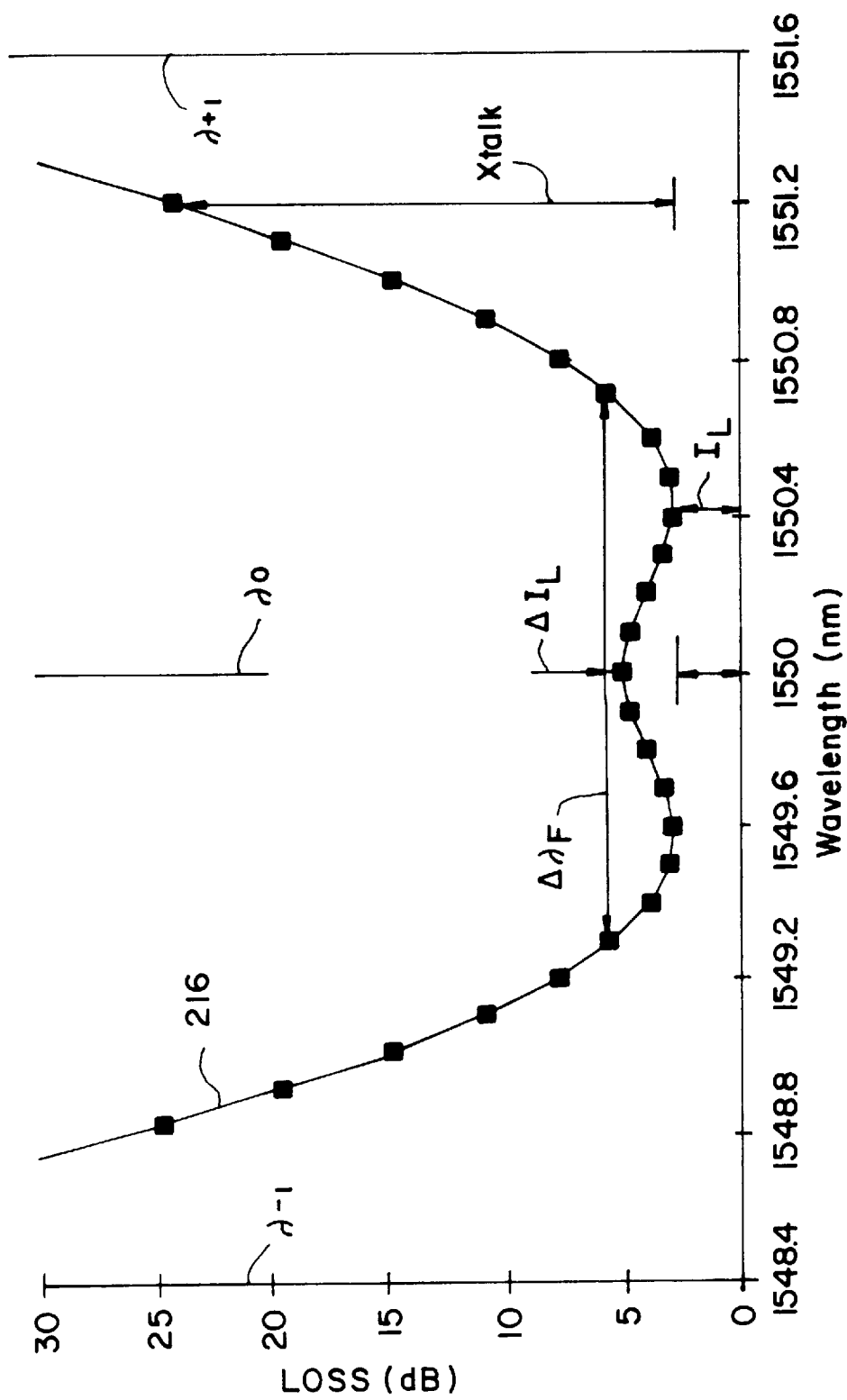
FIG. 7B is a graph showing a spectral response curve of an optical coupling between the common pathway and the one individual pathway of the multiplexer/demultiplexer of FIG. 5C.

The graphs of FIGS. 7A and 7B depict the expected performance of this example as a coupling between the common pathway 152 and the individual pathway 154b. The intensity distribution of a diffracted field 212 is the overlap of two projected images of the mode field at the end face 182 of the common waveguide. The image points 196b and 197b are near the maximum intensities of two lobes that straddle the object point 194b of the mode field 214 at the end face 184b of the individual waveguide 154b.

Figure 8:
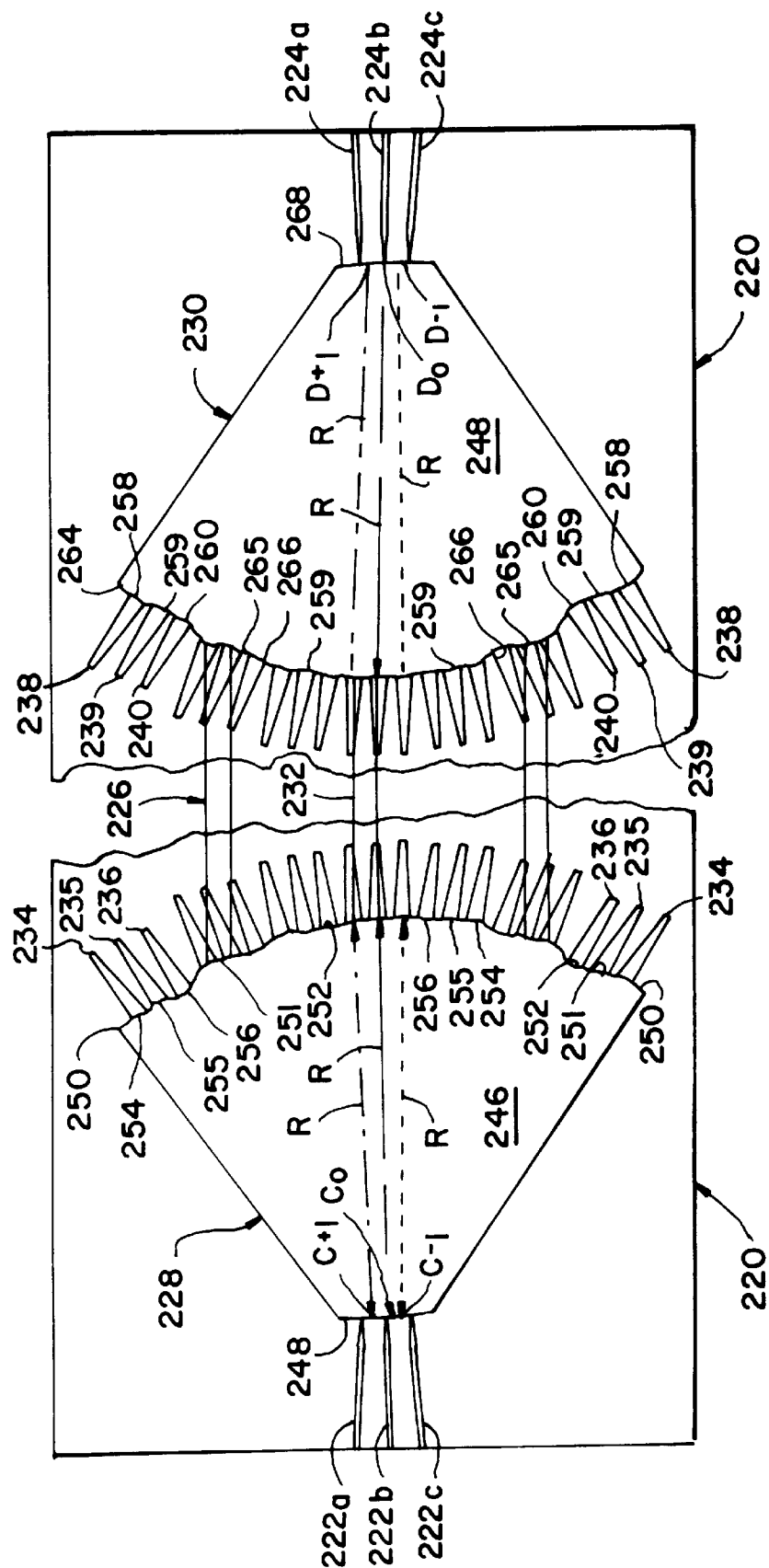
FIG. 8 is a diagram with broken-away views of a similar multiplexer/demultiplexer modified to include three adjacent focal points within each coupler.

The resulting spectral response curve 216 achieves a bandwidth "$\Delta \lambda_F$" equal to 1.4 nm and crosstalk attenuation "Xtalk" of 22 dB within 0.4 nm of adjacent channel wavelengths. Losses at the center wavelength 1550 nm are the sum of the insertion loss "$I_L$" and the loss ripple "$\Delta I_L$". However, much of the loss ripple "$\Delta I_L$" can be eliminated by using three equally spaced focal points as shown in FIG. 8.

The illustrated multiplexer/demultiplexer 220 has a so-called "N×N" configuration represented by three input waveguides 222a, 222b, and 222c and three output waveguides 224a, 224b, and 224c. Any one of the input or output waveguides can function as a common waveguide, and the opposite input or output waveguides can function as individual waveguides.

A phase array 226 and two confocal optical couplers 228 and 230 interconnect the input waveguides 222a–c with the output waveguides 224a–c. Opposite end portions of intermediate waveguides 232 of the phase array 226 are divided into groups of alternating end portions 234–235–236 and 238–239–240. Within the coupler 228, the end portions 234 converge through a slab waveguide 246 to the focal point "$C_{+1}$", the end portions 235 similarly converge to the focal point "$C_0$", and the end portions 236 converge to the focal point "$C_{-1}$". End faces 254 of the end portions 234 are located along an arc 250 centered at the focal point "$C_{+1}$", end faces 255 of the end portions 235 are located along an arc 251 centered at the focal point "$C_0$", and end faces 256 of the end portions 236 are located along an arc 252 centered at the focal point "$C_{-1}$". The three focal points "$C_{+1}$", "$C_0$", and "$C_{-1}$" are preferably located even distances apart along a focal line 248.

The coupler 230 is preferably mirror symmetrical. End faces 258 of the end portions 238 lie on an arc 264 centered at a focal point "$D_{+1}$", end faces 259 of end portions 239 lie on an arc 265 centered at a focal point "$D_0$", and end faces 260 of end portions 240 lie on an arc 266 centered at a focal point "$D_{-1}$". The three focal points "$D_{+1}$" "$D_0$" and "$D_{-1}$" are preferably located even distances apart along a focal line 268; and all of the arcs 250, 251, 252, 264, 265, and 266 preferably have the same radius of curvature "R".

However, the groups of three alternating end portions 234–235–236 and 238–239–240 producing the groups of three focal points "$C_{+1}$", "$C_0$", "$C_{-1}$" and "$D_{+1}$", "$D_0$", "$D_{-1}$" reduce the free spectral range by a factor of three. Similar to the preceding embodiments, the required free spectral range can be restored at a cost in size.

Given the same basic parameters as the immediately preceding embodiment, the further variables to be optimized and the resulting tradeoff

| | |
|---|---|
| Number of focal points per coupler | 3 |
| Spacing between adjacent focal points | 3.04 μm |
| Mode field radius (w) | 3.2 μm |
| Insertion loss ($I_L$) | 3.3 dB |
| Loss ripple at channel center ($\Delta I_L$) | 0.0 dB |
| Channel bandwidth within 3 dB loss ($\Delta\lambda_F$) | 1.4 nm |
| Crosstalk attenuation within 0.4 nm (Xtalk) | 22.0 dB |

Figure 9A:
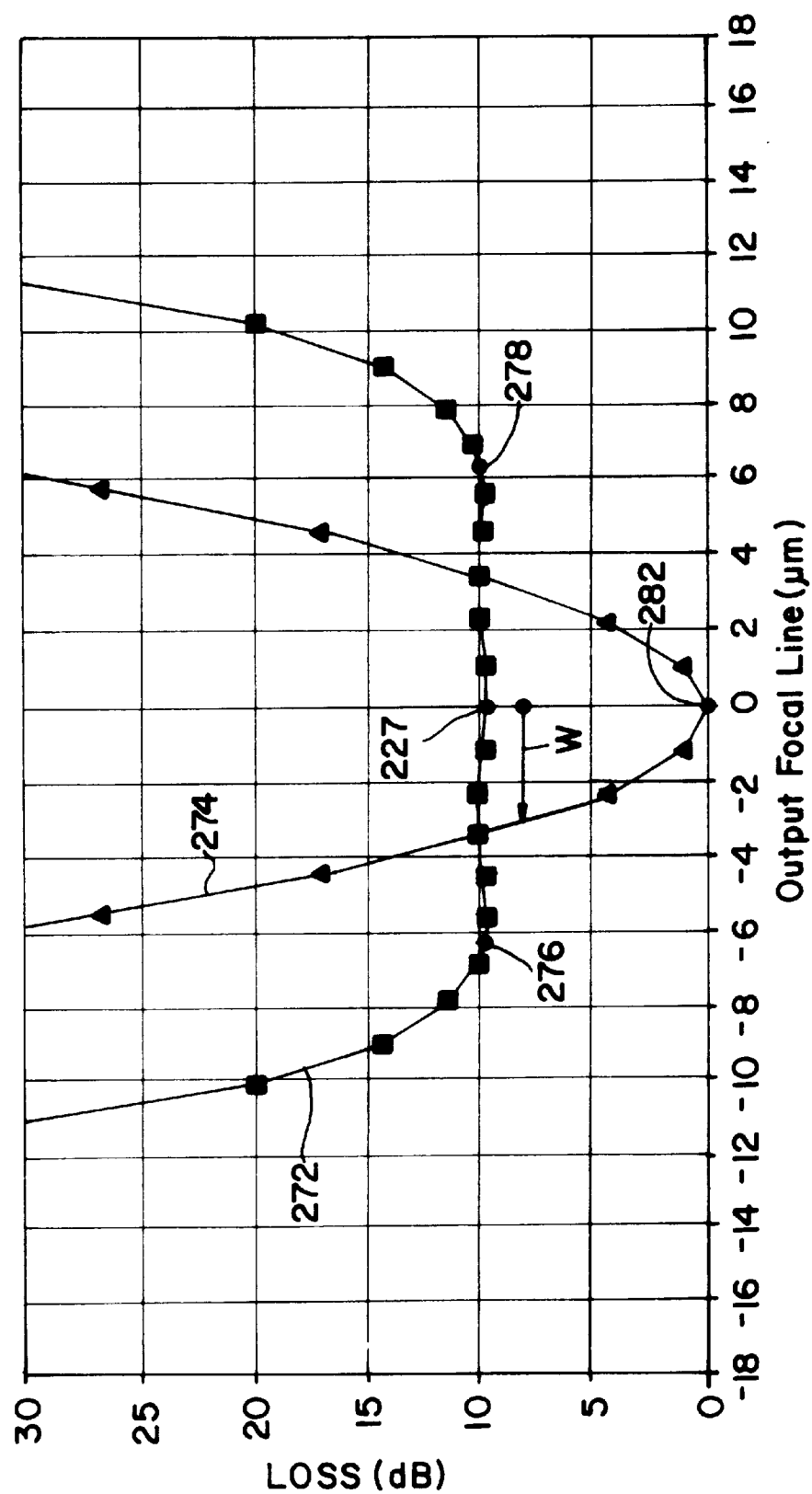
FIG. 9A is a graph of a diffracted field produced within the multiplexer/demultiplexer of FIG. 8 by three images of an input pathway overlaid on a mode field of an output pathway.

FIGS. 9A and 9B depict an exemplary coupling between the input waveguide 222b and the output waveguide 224b. A diffracted field 272 having three less pronounced lobes is overlaid on a mode field 274 at an inner end of the output waveguide 224b. Since both couplers 228 and 230 are identical, image points 276, 277, and 278 of the three mode fields forming the diffracted field 272 are spaced apart at twice the distance between the adjacent focal points. The image point 277 is preferably aligned with an object point 282 of the mode field 274, and the image points 276 and 278 are preferably spaced at equal distances from the object point 282.

The bandwidth "$\lambda_F$" and crosstalk attenuation "Xtalk" measurable from the resulting spectral response curve 284 are the same as the immediately preceding embodiment, but the loss ripple "$I_L$" at the center wavelength has been eliminated with only a slight increase in insertion loss "$I_L$". A remarkably flat passband is apparent throughout most of the bandwidth.

More or less focal points can be used in each coupler to balance competing design interests. For example, one of the couplers 228 or 230 can be arranged with a single focal point and the other of the couplers 228 and 230 can be arranged with two or more focal points. When only one coupler has multiple focal points, the spacing between projected image points matches the spacing between the focal points.

The input and output waveguide structure of the multiplexer/demultiplexer 220 can also be applied to any one of the preceding embodiments as can the number of focal points used for producing the diffracted field. Various modifications to the positions, alternating patterns, and spacing of the focal points are also possible to accomplish specific objectives.

Although the preferred embodiments are implemented in planar form, my invention can also be implemented in bulk optics or in hybrid optics combining planar and bulk components.

I claim:

1. A wavelength multiplexer/demultiplexer comprising:
   a common pathway that conveys a plurality of different wavelength signals;
   individual pathways that separately convey the different wavelength signals;
   a central pathway that couples the different wavelength signals between said common pathway and said individual pathways;
   a dispersing mechanism within said central pathway that angularly disperses the different wavelength signals conveyed by said common pathway; and
   a focusing mechanism within said central pathway that converts the angular dispersion of the different wavelength signals into a spatial dispersion along a focal line, characterized by:
   said focusing mechanism having adjacent focal points for producing multiple image points of each different wavelength signal in relatively displaced positions along the focal line; and
   said individual pathways being located along the focal line so that each of said individual pathways coincides with the multiple image points of one of the different wavelength signals.

2. The multiplexer/demultiplexer of claim 1 in which said dispersing mechanism is an optical path length difference generator having a plurality of different length intermediate pathways for coupling said common and individual pathways.

3. The multiplexer/demultiplexer of claim 2 in which said optical path length difference generator has a constant optical path length difference between adjacent intermediate pathways.

4. The multiplexer/demultiplexer of claim 2 in which said common pathway and said path length difference generator are interconnected by a first coupler, and said individual pathways and said path length generator are interconnected by a second coupler.

5. The multiplexer/demultiplexer of claim 4 in which said focusing mechanism is formed within at least one of said first and second couplers.

6. The multiplexer/demultiplexer of claim 5 in which said intermediate pathways include first ends that converge toward at least one focal point within said first coupler and second ends that converge toward at least one focal point within said second coupler.

7. The multiplexer/demultiplexer of claim 6 in which some of said first ends of the intermediate pathways terminate along a first circular arc and other of said first ends terminate along a second circular arc defining two centers of curvature in the vicinity of said common pathway.

8. The multiplexer/demultiplexer of claim 6 in which some of said second ends of the intermediate pathways terminate along a first circular arc and other of said second ends terminate along a second circular arc defining two centers of curvature in the vicinity of said individual pathways.

9. The multiplexer/demultiplexer of claim 7 in which some of said second ends of the intermediate pathways terminate along a first circular arc and other of said second ends terminate along a second circular arc defining two centers of curvature in the vicinity of said individual pathways.

10. The multiplexer/demultiplexer of claim 8 in which the image points for each wavelength signal are spaced along the focal line by a distance that exceeds a spacing between the two centers of curvature in the vicinity of the individual pathways.

11. The multiplexer/demultiplexer of claim 6 in which some of said first ends of the intermediate pathways converge toward a first focal point and other of said first ends converge toward a second focal point that is adjacent to said first focal point.

12. The multiplexer/demultiplexer of claim 11 in which said some and other first ends are arranged in an alternating pattern.

13. The multiplexer/demultiplexer of claim 11 in which said some and other first ends are arranged in separate groups.

14. The multiplexer/demultiplexer of claim 7 in which some of said first ends of the intermediate pathways converge toward a first focal point and other of said first ends converge toward a second focal point that is adjacent to said first focal point.

15. The multiplexer/demultiplexer of claim 6 in which some of said second ends of the intermediate pathways converge toward a first focal point and other of said second ends converge toward a second focal point that is adjacent to said first focal point.

16. The multiplexer/demultiplexer of claim 15 in which said some and other second ends are arranged in an alternating pattern.

17. The multiplexer/demultiplexer of claim 15 in which said some and other second ends are arranged in separate groups.

18. The multiplexer/demultiplexer of claim 8 in which some of said second ends of the intermediate pathways converge toward a first focal point and other of said second ends converge toward a second focal point that is adjacent to said first focal point.

19. The multiplexer/demultiplexer of claim 1 in which said dispersing mechanism is a diffractive optic.

20. The multiplexer/demultiplexer of claim 19 in which said focusing mechanism is a curved reflective surface of said diffractive optic.

21. The multiplexer/demultiplexer of claim 20 in which said diffractive optic includes a first group of facets defining one of said focal points and a second group of facets defining the other of said focal points.

22. The multiplexer/demultiplexer of claim 21 in which said first and second groups of facets are arranged in an alternating pattern.

23. The multiplexer/demultiplexer of claim 21 in which said first and second groups of facets are arranged in separate groups.

24. The multiplexer/demultiplexer of claim 21 in which said first and second groups of facets are located along respective circular arcs.

25. The multiplexer/demultiplexer of claim 21 in which curvature centers of said circular arcs are located along respective Rowland circles of said diffractive optic.

26. The multiplexer/demultiplexer of claim 25 in which said focal points are located at respective centers of the Rowland circles.

27. The multiplexer/demultiplexer of claim 25 in which said common pathway and said individual pathways have inner ends also located along the Rowland circles.

28. The multiplexer/demultiplexer of claim 21 in which the image points for each different wavelength signal are spaced through a distance that is less than the wavelength dispersion of said diffractive optic along the focal line between different wavelength signals.

29. The multiplexer/demultiplexer of claim 2 in which:
   (a) said common pathway and each of said individual pathways have inner and outer ends,
   (b) said inner ends are adjacent to said central pathway, and
   (c) said inner and outer ends vary in width for relatively adjusting wavelength bandwidth and crosstalk attenuation between adjacent individual waveguides.

30. The multiplexer/demultiplexer of claim 19 in which:
   (a) said common pathway and each of said individual pathways have inner and outer ends,
   (b) said inner ends are adjacent to said central pathway, and
   (c) said inner and outer ends vary in width for relatively adjusting wavelength bandwidth and crosstalk attenuation between adjacent individual waveguides.

31. The multiplexer/demultiplexer of claim 29 in which said inner ends are increased in width to maximize wavelength bandwidth at a predetermined amount of crosstalk attenuation between the adjacent individual waveguides.

32. The multiplexer/demultiplexer of claim 31 in which said inner end of the common pathway is sized similar to said inner ends of the individual pathways for reducing coupling losses.

33. The multiplexer/demultiplexer of claim 31 in which a slope of transition between said inner and outer ends is limited to provide an adiabatic transition between said ends.

34. The multiplexer/demultiplexer of claim 1 in which said focusing mechanism has at least three focal points.

35. The multiplexer/demultiplexer of claim 34 in which corresponding image points of each different wavelength signal are evenly spaced along the focal line.

36. The multiplexer/demultiplexer of claim 1 in which said dispersing mechanism angularly disperses the different wavelength signals within a free spectral range and said adjacent focal points of said focusing mechanism reduce the free spectral range.

37. The multiplexer/demultiplexer of claim 36 in which the free spectral range is reduced by a factor equal to the number of adjacent focal points.

38. The multiplexer/demultiplexer of claim 36 in which:
   (a) the plurality of different wavelength signals span an operating bandwidth,
   (b) the different wavelength signals are angularly dispersed as a function of a diffraction order of said dispersing mechanism, and
   (c) and the diffraction order is adjusted in size to maintain the free spectral range larger than the operating bandwidth.

39. An optical connector for routing optical signals according to their wavelength comprising:
   a common pathway for conveying a plurality of such optical signals within different bands of wavelengths;
   individual pathways arranged in an array for separately conveying the optical signals within the different bands;
   a focuser interconnecting said common pathway and said individual pathways by separately imaging said common pathway in each wavelength of the optical signals; and
   a wavelength disperser optically coupled to said focuser so that the images of the common pathway are displaced in positions along said end of the array according to their wavelength, characterized by:
      said focuser arranged for forming at least two of the images for each wavelength along said end of the array;
      the two images in each wavelength being offset so that corresponding images in different wavelengths can be formed at each position along said end of the array; and
      said individual pathways of the array being respectively centered at said positions at which the corresponding images in different wavelengths are formed so that a wider range of wavelengths within each band can be coupled between said common and individual pathways with no additional variation in efficiency.

40. The connector of claim 39 in which:
   (a) said focuser and said wavelength disperser form a plurality of optical couplings between said common and individual pathways, (b) said optical couplings exhibit spectral response curves defined by decibel loss over a domain of wavelengths, (c) said bands of wavelengths are defined as a contiguous group of wavelengths within which decibel loss is less than a predetermined amount, and (d) the two images of each wavelength are offset by an amount that extends the range of wavelengths within each band beyond a range associated with otherwise forming a single image of each wavelength.

41. The connector of claims 40 in which:

(a) each of said common and individual pathways conveys light energy distributed throughout a mode field and (b) said focuser projects overlapping images of said common pathway mode field onto each of said individual pathways in a direction of light travel from said common pathway to said individual pathways.

42. The connector of claim 41 in which said focuser projects overlapping images of said individual pathway mode fields onto said common pathway in an opposite direction of light travel from said individual pathways to said common pathway.

43. The connector of claim 41 in which:

(a) the overlapping images of the common pathway exhibit respective light energy distributions throughout diffracted fields and (b) the response curves of the optical couplings between said common and individual pathways are further defined by an overlap integral between the diffracted fields and the mode fields of the individual pathways.

44. The connector of claim 41 in which:

(a) image points are defined at peak intensities of said images of the common pathway mode field and (b) said image points of the overlapping images are spaced apart by an amount that is less than a spacing between centers of said individual pathways along said end of the array.

45. The connector of claim 44 in which said image points of the overlapping images are spaced apart by an amount that exceeds the mode field radii of the individual pathway mode fields defined at $1/e^2$ from the maximum intensity of the respective mode fields.

46. The connector of claim 44 in which said focuser includes at least two adjacent focal points for forming the at least two images for each wavelength.

47. The connector of claim 44 in which said adjacent focal points are located along said end of the array.

48. The connector of claim 47 in which:

(a) said common pathway includes an inner end adjacent to said wavelength disperser and (b) said focuser includes at least two additional adjacent focal points located along said inner end of the common pathway.

49. The connector of claim 48 in which said image points are spaced apart by a sum of the spacings between said adjacent focal points along said inner end of the common pathway and between said adjacent focal points along said end of the array of individual pathways.

50. The connector of claim 39 in which said focuser includes three focal points located along said end of the array.

51. The connector of claim 50 in which said three focal points are evenly spaced.

52. A method of routing different wavelength signals between a common pathway and a plurality of individual pathways comprising the steps of:

conveying a plurality of different wavelength signals along the common pathway;

separately conveying the different wavelength signals along the individual pathways;

forming a first set of images of each of the different wavelength signals conveyed by the common pathway at inner ends of the individual pathways;

forming a second set of images of each of the different wavelength signals conveyed by the common pathway at the inner ends of the individual pathways; and relatively displacing the first and second sets of images so that the two images of each of the different wavelength signals are displaced at the inner ends of the individual pathways.

53. The method of claim 52 in which said step of relatively displacing includes spacing the two images of each different wavelength signal through a distance that is less than a distance separating centers of the inner ends of the individual pathways.

54. The method of claim 52 in which:

(a) light energy is distributed at the inner ends of the individual pathways in mode fields having respective radii and (b) said step of relatively displacing has the effect of increasing crosstalk between the individual pathways.

55. The method of claim 54 in which said step of relatively displacing is accompanied by the further step of adjusting the mode field radii of the inner ends of the individual pathways to counteract the increase in crosstalk.

56. The method of claim 52 in which said steps of forming first and second sets of images include forming images of an inner end of the common pathway along the inner ends of the individual pathways.

57. The method of claim 56 in which image points are defined at peak intensities of the respective images and said steps of forming first and second sets of images superimpose image points of more than one wavelength on the inner ends of the individual pathways.

58. The method of claim 57 in which at least three image points of different wavelengths are superimposed on the inner ends of the individual pathways.

59. The method of claim 52 in which optical couplings between the common pathway and the individual pathways exhibit response curves defined by decibel loss over a domain of wavelengths and said first and second sets of images are displaced by an amount that flattens the response curves adjacent to the different wavelength signals.

60. The method of claim 52 including the further steps of:

(a) forming a third set of images of each of the different wavelength signals conveyed by the common pathway at the inner ends of the individual pathways and (b) relatively displacing the third set of images with respect to the first and second sets of images so that three images of each of the different wavelength signals are displaced at the inner ends of the individual pathways.

61. The method of claim 60 in which said steps of relatively displacing include displacing the first, second, and third sets of images by even amounts.

\* \* \* \* \*